United States Patent
Cannon et al.

[11] Patent Number: 6,067,444
[45] Date of Patent: May 23, 2000

[54] METHOD AND APPARATUS FOR DUPLICATE MESSAGE PROCESSING IN A SELECTIVE CALL DEVICE

[75] Inventors: Gregory Lewis Cannon, Keller; Vernon Lyle Diehl, Fort Worth; Ardsley Pihl Congdon, Jr., Euless, all of Tex.

[73] Assignee: Motorola, Inc., Schaumburg, Ill.

[21] Appl. No.: 08/876,055

[22] Filed: Jun. 13, 1997

[51] Int. Cl.[7] .................................................. H04Q 7/14
[52] U.S. Cl. .................. 455/38.1; 455/575; 340/825.44
[58] Field of Search .............................. 455/38.1, 38.2, 455/38.3, 38.4, 38.5, 31.2, 412, 228, 575; 340/825.44

[56] References Cited

U.S. PATENT DOCUMENTS

| | | | |
|---|---|---|---|
| 4,875,038 | 10/1989 | Siwiak et al. | 340/825.44 |
| 5,168,493 | 12/1992 | Nelson et al. | 370/84 |
| 5,258,739 | 11/1993 | DeLuca et al. | 455/38.1 X |
| 5,347,269 | 9/1994 | Vanden Heuvel et al. | 340/825.44 |
| 5,384,565 | 1/1995 | Cannon | 340/825.44 |
| 5,640,682 | 6/1997 | Wagai et al. | 455/38.4 X |
| 5,809,016 | 9/1998 | Kreitzer | 455/38.4 X |
| 5,856,787 | 1/1999 | Ikka | 455/38.1 X |

*Primary Examiner*—Wellington Chin
*Assistant Examiner*—Philip J. Sobutka
*Attorney, Agent, or Firm*—R. Louis Breeden

[57] ABSTRACT

A method (100) for enhanced duplicate message processing at a portable subscriber unit (122) comprises the steps of receiving a first message having a first set of message data and a message sequence number associated with the first message. Then portable subscriber unit receives (402) a subsequent message having the same message sequence number (406) and a subsequent set of message data and creates error indications corresponding to errors detected in the portions of the subsequent set of message data. Then the portable subscriber unit compares (412) the first set of message data and its corresponding error indications with the subsequent set of message data and its corresponding error indications. The subsequent message is then tagged (420) if the subsequent message has less error indications (414) than the first message and if the first message was deleted by the user (418) and if the first message contained an error (426).

22 Claims, 6 Drawing Sheets

FIG. 7

| 1 2 3 4 5 6 7 | ...21 | 22............31 | 32 |
|---|---|---|---|
| x0 x1 x2 x3 c0 c1 c2 c3 f0 f1 f2 f3 f4 f5 f6 n0 r0 t0 t1 t2 t3 p p p p p p | INFORMATION | PARITY | CK |
| 0 0 1 1 1 0 0 0 1 1 1 0 0 0 0 0 0 1 | | | |

FIG. 8

| 1 2 3 4 5 6 7 | ...21 | 22............31 | 32 |
|---|---|---|---|
| x0 x1 x2 x3 P0 P1 P2 P3 a0 a1 v0 v1 v2 v3 v4 v5 c0 c1 m0 m1 m2 p p p p p | INFORMATION | PARITY | CK |
| 0 1 0 1 0 1 0 0 1 0 0 1 1 1 1 0 0 1 1 | | | |

FIG. 9

| 1 2 3 4 5 6 7 | ...21 | 22............31 | 32 |
|---|---|---|---|
| x0 x1 x2 x3 f0 f1 f2 s0 s1 s2 s3 s4 s5 s6 s7 s8 s9 s10 s11 s12 s13 p p p p p | INFORMATION | PARITY | CK |
| 1 1 0 1 1 0 0 1 0 1 0 0 1 1 1 1 0 0 1 1 | | | |

METHOD AND APPARATUS FOR DUPLICATE MESSAGE PROCESSING IN A SELECTIVE CALL DEVICE

FIELD OF THE INVENTION

This invention relates in general to radio communication systems and more specifically to a method and apparatus of handling duplicate messages received at a portable subscriber unit.

BACKGROUND OF THE INVENTION

In both one-way paging and two-way messaging, duplicate messages may be sent to a selective call device such as a selective call receiver or transceiver for a variety of reasons. A one-way paging system may intentionally be designed to send duplicate messages to create (at the expense of system latency and capacity) greater reliability through time diversity, such as in Motorola's FLEX-TD paging system used in Japan. In each instance, there are several factors that creates complications in the processing of such duplicate messages. For instance, when messages are sent multiple times in an unreliable radio frequency environment, errored characters are received. Most errors are corrected using forward error correction, but some errors are only detected. Other codewords in the message may be so badly corrupted that they correct to the wrong codeword. When a badly corrupted portion of a message corrects to a wrong codeword or character, falsing occurs and detection of duplicate messages becomes a significant problem. In current alphanumeric two-way paging, for example, detected errors are handled in duplicate message processing by treating them as wildcards that match any character in future versions of that repeated message. This causes the user to only see one version of the message to be displayed. However, falsed characters are not treated as wildcards, and therefore the entire message shows up as a new message which the user sees as an undesirable duplicate message on their display. Thus, a need exists for a duplicate message processing method and apparatus that recognizes the problem encountered with falsing of error corrected messages and that appropriately handles such duplicate messages by avoiding the repeat display or alerting of such duplicate messages.

In a two-way messaging environment, a message may be resent to a selective call transceiver (pager) because the message was not delivered well (possibly had too many errors), or an acknowledgment was not received by the two-way messaging system. In any instance, the same message will be received by the pager, wherein the pager has the option to retain errored messages. Most two-way pagers enable this option because the first message received may be the only message it receives and the user may want an opportunity to view such messages despite the error level the message contains. Additionally, for both one-way and two-way device, the ability to recognize a duplicate message is further complicated by the fact that the user or the pager itself could delete a previously received message. Thus, a pager user that deletes a message because of convenience (i.e., message was read and occupied unnecessary space in memory) may receive a duplicate message without an adequate means of detecting such duplicate as a result of the previous deletion. Of course, a pager user or a pager itself that deleted a message failing to meet a certain threshold of quality would want to receive a subsequent duplicate message. Therefore, a need also exists for a selective call device and method of operation of such device that would logically detect whether a page was deleted for convenience or for quality reasons and appropriately handle subsequent duplicate messages with minimal burden on the user.

SUMMARY OF THE INVENTION

In a first aspect of the present invention, a method for enhanced duplicate message processing at a portable subscriber unit comprises the steps of receiving a first message having a first set of message data and a message sequence number associated with the first message. Then method further includes steps for creating error indications corresponding to errors detected in portions of the first set of message data and storing the first message along with a deletion status containing an error status for the first message in a memory location at the portable subscriber unit. Then portable subscriber unit receives a subsequent message having the same message sequence number and a subsequent set of message data and creates error indications corresponding to errors detected in the portions of the subsequent set of message data. Then the portable subscriber unit compares the first set of message data and its corresponding error indications with the subsequent set of message data and its corresponding error indications. The subsequent message is then tagged to form a tagged message if the subsequent message has less error indications than the first message and the tagged message is then processed utilizing the deletion status containing the error status for the first message.

In a second aspect of the present invention, a method for enhanced duplicate message processing at a portable subscriber unit comprises the steps of receiving a message having message data and a message sequence number associated with the message and creating error indications in the message data for respective portions of the message data received with errors. Then, the portable subscriber unit compares the message and the error indications with a prior message having the same message sequence number and respective error indications from a set of messages already stored in a memory at the portable subscriber unit, wherein the step of comparing further comprises the step of determining whether a ratio of duplicate characters to total characters found in both the message and prior message exceeds a threshold. If the message has a ratio exceeding the predetermined threshold and has less error indications than the prior message, then the message is tagged to form a tagged message.

In a third aspect of the present invention, a selective call device comprises a selective call receiver coupled to a decoder and a controller and a memory coupled to the controller. The controller is preferably programmed to direct the selective call receiver to receive a first message having a first set of message data and a message sequence number associated with the first message, create error indications corresponding to errors detected in portions of the first set of message data, and store the first message along with a deletion status containing an error status for the first message in the memory. Then the controller is programmed to direct the selective call receiver to receive a subsequent message having the same message sequence number and a subsequent set of message data and create error indications corresponding to errors detected in the portions of the subsequent set of message data. Then the controller compares the first set of message data and its corresponding error indications with the subsequent set of message data and its corresponding error indications. The subsequent message is tagged to form a tagged message if the subsequent message has less error indications than the first message. If tagged, the tagged message is then processed utilizing the deletion status containing the error status for the first message.

In yet another aspect of the present invention, a selective call device comprises a selective call receiver coupled to a decoder and a controller and a memory coupled to the controller. The controller is preferably programmed to direct the selective call receiver to receive a message having message data and a message sequence number associated with the message and to create error indications in the message data for respective portions of the message data received with errors. Then the controller compares the message and the error indications with a prior message having the same message sequence number and respective error indications from a set of messages already stored in the memory, wherein the controller further determines whether a ratio of duplicate characters to total characters found in both the message and the prior message exceeds a predetermined threshold. If the message has a ratio exceeding the predetermined threshold and has less error indications than the prior message, then the message is tagged to form a tagged message.

BRIEF DESCRIPTION OF THE DRAWINGS

FIG. 7 illustrates a structure of a frame information word according to the present invention.

FIGS. 8 and 9 illustrate structures of block information words.

DETAILED DESCRIPTION

Figure 1:
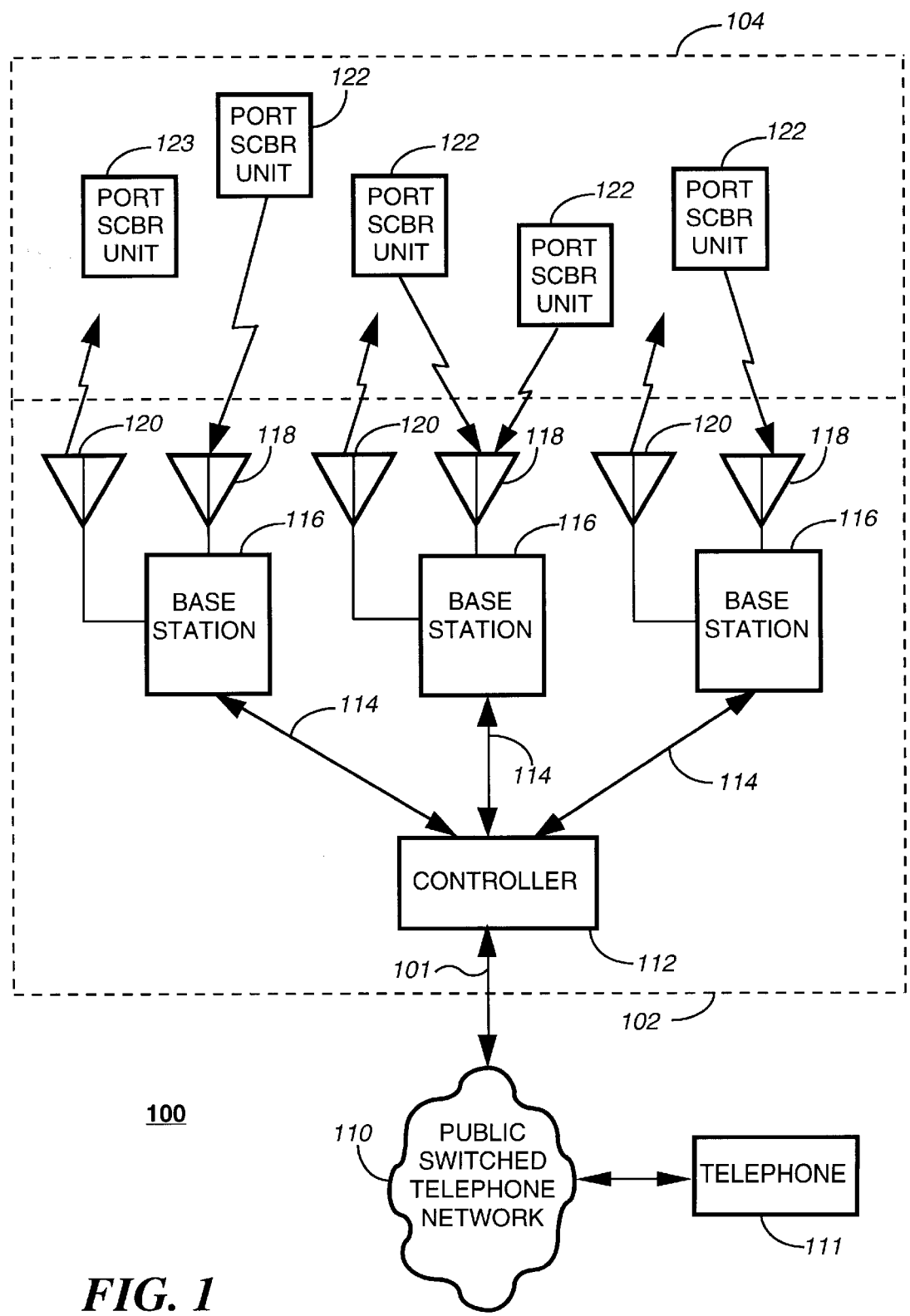
FIG. 1 is block diagram of a communication system in accordance with the present invention.

Referring to FIG. 1, a block diagram of a communication system 100 in accordance with the present invention comprises a fixed portion 102 and a portable portion 104. The fixed portion 102 comprises a plurality of conventional base transceivers which are base stations 116 coupled by communication links 114 to a controller 112 for controlling the base stations 116. The hardware of the controller 112 is preferably similar to the Wireless Messaging Gateway (WMG™) Administrator! messaging terminal manufactured by Motorola, Inc. of Schaumburg, Ill. The hardware of the base stations 116 is preferably similar to the Nucleus® II transmitter manufactured by Motorola, Inc. of Schaumburg, Ill. Other similar hardware can be utilized as well for the controller 112 and base stations 116. The controller 112 comprises a plurality of firmware elements in accordance with the present invention, as will be described further below.

Each of the base stations 116 transmits radio signals to the portable portion 104 comprising a plurality of portable subscriber units 122 and 123 via a transmitting antenna 120. Note that it is within contemplation of the present invention to use either a selective call transceiver 122 or a selective call receiver 123. The base stations 116 each receive radio signals from the plurality of portable subscriber units 122 via a receiving antenna 118 coupled to a base receiver within the base station (see FIG. 2). The radio signals comprise selective call addresses and messages transmitted to the portable subscriber units 122 and 123 and acknowledgments received from the portable subscriber units 122. It will be appreciated that the portable subscriber units 122 can also originate messages other than acknowledgments. The controller 112 preferably is coupled to a conventional telephone 111 via telephone links 101 and a public switched telephone network (PSTN) 110 for receiving selective call originations therefrom. Selective call originations comprising voice and data messages from the PSTN 110 can be generated, for example, from the conventional telephone 111 coupled to the PSTN 110 in a manner that is well known in the art.

Data and control transmissions between the base stations 116 and the portable subscriber units 122 and 123 preferably utilize a well-known digital selective call signaling protocol, such as the Motorola FLEX™ family of protocols. It will be appreciated that other similar protocols can be utilized as well. These protocols utilize well-known error detection and error correction techniques and are therefore tolerant to bit errors occurring during transmission, provided that the bit errors are not too numerous in any one code word.

Outbound channel transmissions comprising data and control signals from the base stations 116 preferably utilize two- and four-level frequency shift keyed (FSK) modulation, operating at sixteen-hundred or thirty-two-hundred symbols-per-second (sps), depending on traffic requirements and system transmission gain. Inbound channel transmissions from the portable subscriber units 122 to the base stations 116 preferably utilize four-level FSK modulation at a rate of ninety-six-hundred bits per second (bps). Inbound channel transmissions preferably occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on a single carrier frequency utilizing well-known time division duplex (TDD) techniques for sharing the frequency. It will be appreciated that, alternatively, frequency division duplex (FDD) can be utilized as well for the outbound and inbound channels.

U.S. Pat. No. 4,875,038 to Siwiak et al., which describes a prior acknowledge-back selective call communication system, is hereby incorporated herein by reference. For further information on the operation and structure of an acknowledge-back selective call communication system, please refer to the Siwiak et al. patent.

Figure 2:
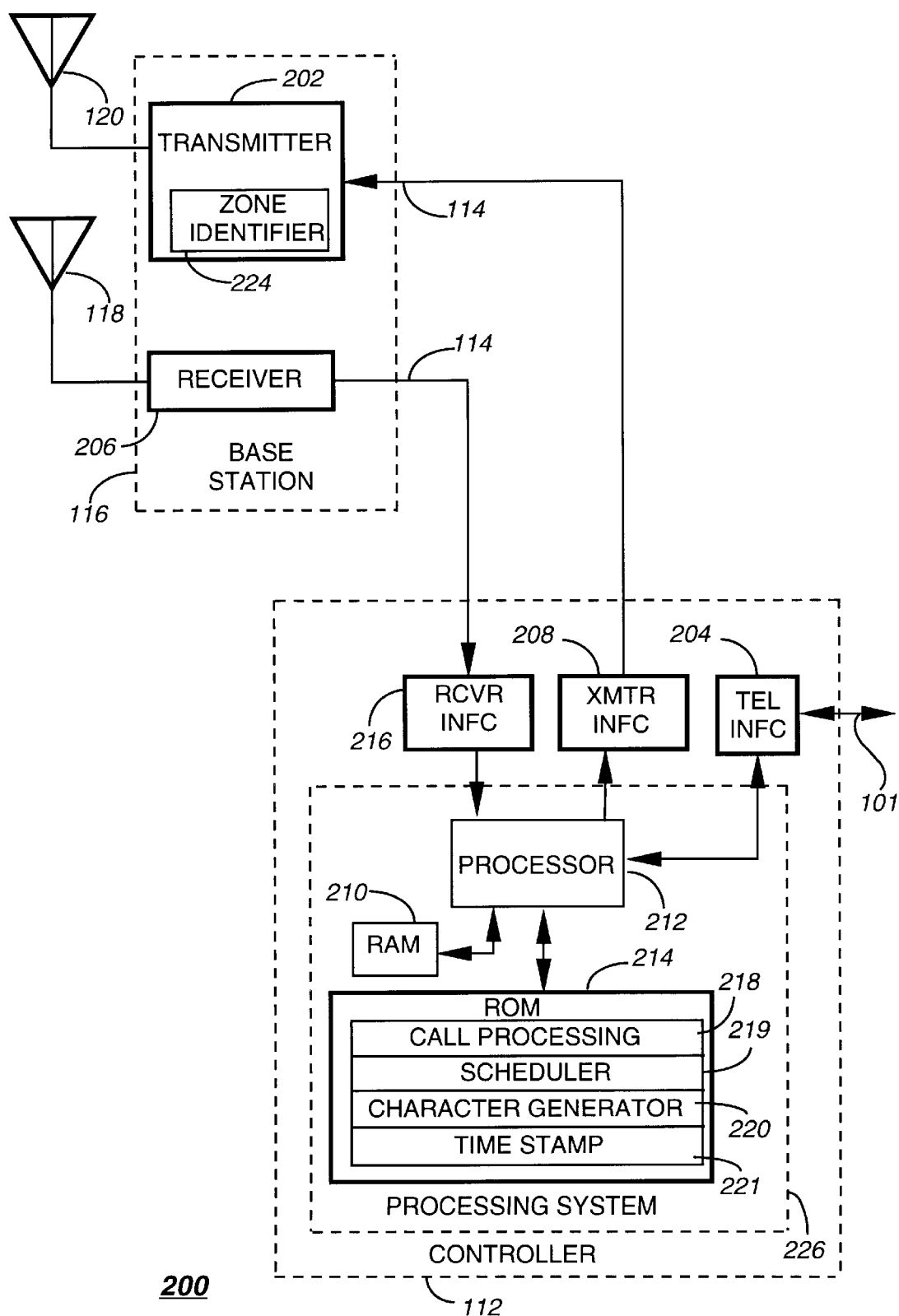
FIG. 2 is an electrical block diagram of portions of a controller and base station in accordance with the present invention.

Referring to FIG. 2, an electrical block diagram 200 of portions of the controller 112 and base station 116 in accordance with the present invention shows that the controller 112 comprises a processing system 226 for directing operation of the controller 112. The processing system 226 includes a processor 212 that is preferably coupled through a transmitter interface 208 to a transmitter 202, both utilizing conventional techniques well known in the art. The transmitter 202 preferably transmits two- and four-level FSK data messages to the portable subscriber units 122. Also preferably, the transmitter 202 comprises a zone identifier 224 stored within a non-volatile memory thereof for identifying a coverage zone in which the transmitter operates. The zone identifier 224 is preferably a non-zero value unique to the zone in which the transmitter 202 is located.

The processor 212 is also coupled through a conventional receiver interface 216 to at least one acknowledgment receiver 206 using conventional binary FSK demodulation.

The acknowledgment receiver 206 can be collocated with the base stations 116, as implied in FIG. 2, but preferably is positioned remote from the base stations 116 to avoid interference from the transmitter 202. Additionally, a number of remote acknowledgment receivers 206 could be used and coupled to the receiver interface 216. The acknowledgment receiver 206 is for receiving one or more acknowledgments from the plurality of portable subscriber units 122. In addition, the processor 212 is coupled through a telephone interface 204 to the telephone links 101 and thence to the PSTN 110 for receiving message originations therefrom.

The processor 212 is coupled to a random access memory (RAM) 210 for storing messages to be transmitted to the portable subscriber units 122 or 123, and for storing messages received from the portable subscriber units 122. The processor 212 also is coupled to a read-only memory (ROM) 214 comprising firmware elements for use by the processor 212. It will be appreciated that other types of memory, e.g., electrically erasable programmable ROM (EEPROM) or magnetic disk memory, can be utilized as well for the ROM 214 or RAM 210. It will be further appreciated that the RAM 210 and the ROM 214, singly or in combination, can be integrated as a contiguous portion of the processor 212. Preferably, the processing system 226 is a conventional, commercially available computer system such as a VME Sparc processor system manufactured by Sun Microsystems, Inc. It will be appreciated that other similar processors can be utilized as well for the processor system 226, and that additional processor systems of the same or alternative type can be added as required to handle the processing requirements of the controller 112. The firmware elements of the controller 112 preferably comprise a call processing element 218 for processing calls in a manner well known in the art. Further, the ROM 214 preferably contains additional firmware elements including a scheduler element 219, a character generator element 220, and a time stamping element 221. The call processing element 218 receives a plurality of messages for the subsequent wireless transmission to a plurality of portable subscribers units. The scheduler element 219 assigns a message sequence number (MSN) to each of the plurality of messages and the character generator element 218 appends a special character (like a control character) to each of the messages, wherein the special character would allow a duplication processor at each of the portable subscriber units to ignore characters appended after the special character (at least for duplicate message determinations). For instance, the time stamping element could provide both a time stamp and time zone indication after the special character which should be ignored for purposes of character by character comparision in the duplicate message recognition process. Of course, the time stamp would not necessarily be ignored, but can be used to determine if the message is stale compared to a previously received message.

Figure 3:
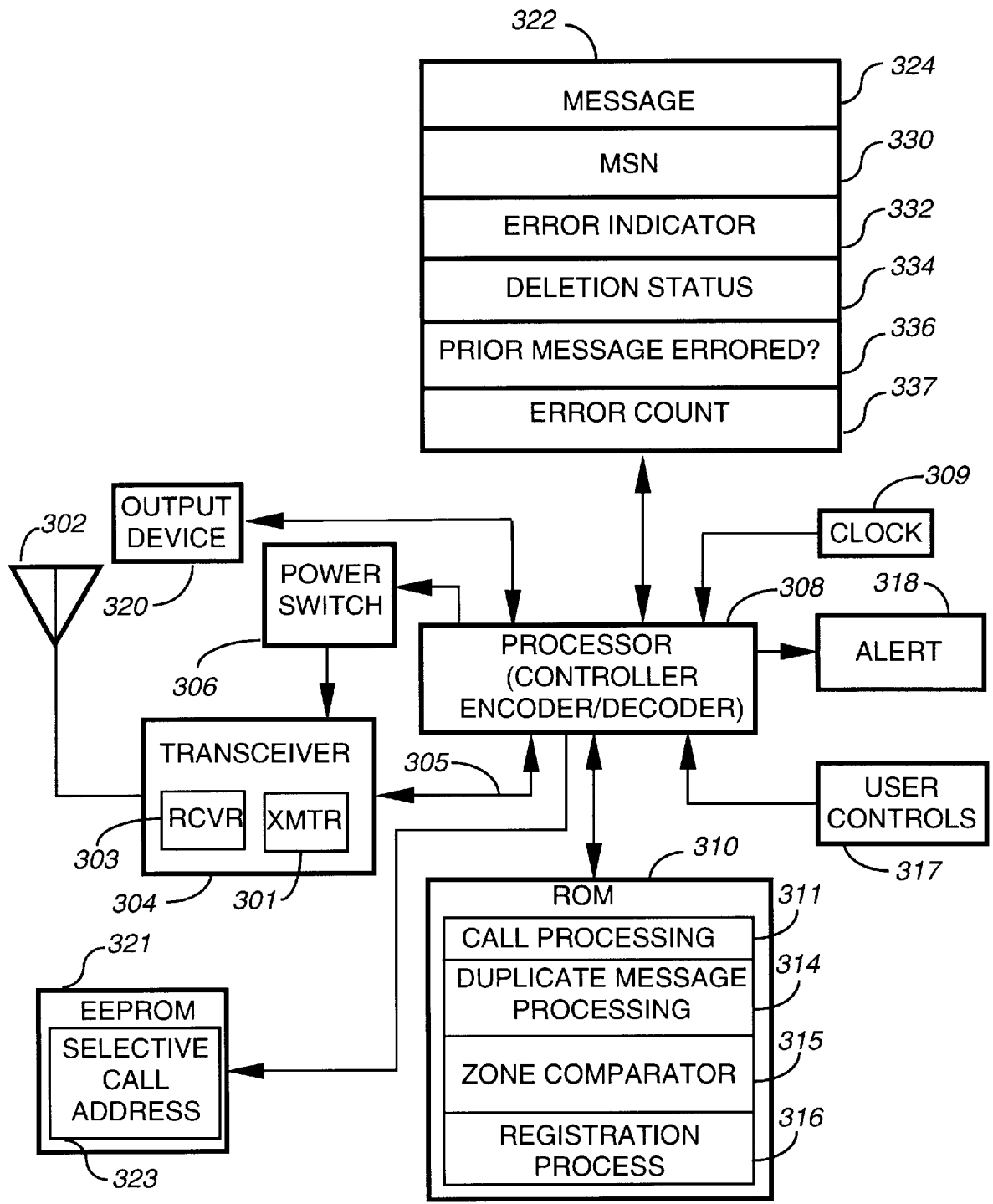
FIG. 3 is an electrical block diagram of a portable subscriber unit in accordance with the present invention.

Referring to FIG. 3, an electrical block diagram depicts the portable subscriber unit 122 in accordance with the present invention. The portable subscriber unit 122 comprises a transceiver antenna 302 for transmitting and intercepting radio signals to and from the base stations 116. The radio signals linked to the transceiver antenna 302 are coupled to a transceiver 304 comprising a conventional transmitter 301 and receiver 303. The radio signals received from the base stations 116 use conventional two and four-level FSK. It will be appreciated by one of ordinary skill in the art that the transceiver antenna 302 is not limited to a single antenna for transmitting and receiving radio signals. Separate antennas for receiving and transmitting radio signals would also be suitable.

Radio signals received by the transceiver 304 produce demodulated information at the output. The demodulated information is transferred over a signal information bus 305 which is coupled to the input of a processor 308, which processes the information in a manner well known in the art. Similarly, acknowledge response messages are processed by the processor 308 and delivered through the signal information bus 305 to the transceiver 304. The acknowledge response messages transmitted by the transceiver 304 are preferably modulated using four-level FSK operating at a bit rate of ninety-six-hundred bps. It will be appreciated that, alternatively, other bit rates and other types of modulation can be used as well.

A conventional power switch 306, coupled to the processor 308, is used to control the supply of power to the transceiver 304, thereby providing a battery saving function. A clock 309 is coupled to the processor 308 to provide a timing signal used to time various events as required in accordance with the present invention. The processor 308 also is preferably coupled to a electrically erasable programmable read only memory (EEPROM) 321 which comprises at least one selective call address 323 assigned to the portable subscriber unit 122 and used to implement the selective call feature. The processor 308 also is coupled to a random access memory (RAM) 322 for storing the following: a message in a plurality of message storage locations 324, a message sequence number (MSN) 330 corresponding to each of the messages stored in memory, an error indicator 332, a deletion status 334, and an error status 336. In addition, an error counter 337 should be maintained to keep track of the number of errors found in each of the corresponding messages. Of course, other information could be stored that would be useful in a two-way messaging system such as zone identifiers and general purpose counters to preferably count calls (to and from the PSU). The table below showing a sampling of the contents of the RAM 322 may further illustrate the method and apparatus in accordance with the present invention.

| Message | MSN | Error Indicator | Deletion. Status | Error Detected | Error Count |
|---|---|---|---|---|---|
| HELLO | 125 | X00000 | 0 | 0 | 0 |
| B*E!! | 126 | X01000 | 0 | 1 | 1 |
| CALL M* | 127 | X00001 | 0 | 1 | 1 |
| *Y*!! | 126 | X10100 | 0 | 1 | 2 |
| CALL ME | 32 | X00000 | 0 | 0 | 0 |
| X2378 | 33 | X00000 | 1 | 0 | 0 |
| X2388 | 33 | X00000 | 0 | 0 | 0 |
| BYE!! | 34 | X00000 | 0 | 0 | 0 |
| HDLP ME! | 35 | X00000 | 1 | 0 | 0 |
| 1MORE | 36 | X00000 | 0 | 0 | 0 |
| HELP ME! | 35 | X00000 | 0 | 0 | 0 |
| . | . | . | . | . | . |
| . | . | . | . | . | . |
| . | . | . | . | . | . |
| BYE!! | 126 | X00000 | 0 | 0 | 0 |

The MSN is typically a circular list of numbers, in this instance ranging from 32 to 127. The error indicator shows where the error occurred using a "1". Deletion status uses a "1" to show that a user deleted the message from the user interface, although the message may still be retained in memory. Error Detected uses a "1" to indicate that at least one error occurred in the decoding of the message. Finally, Error count keeps a count of the number of error found in a particular message. The message "HELLO" having MSN 125 is received without errors. The message "B*E!!" having MSN 126 is received with one error ("*" is used as a wildcard character). A subsequent duplicate message "*Y*!!" having the same MSN is then received also having errors in different locations. Thus, in one of many various schemes the subsequent duplicate message could be used to update the older message or the older message could be used to correct the subsequent message. Alternatively, if the subsequent message had fewer errors, the subsequent message could have simply replaced the older duplicate message. Note that the same message "BYE!!" is sent again, but with the MSN of 34. In this instance, in accordance with the present invention, the duplicate message processing would treat this message as a new message because it has a different MSN. Note that the message "BYE!!" with an MSN of 126 is sent again at the bottom of the table. This would be treated as a duplicate message and possibly ignored if the previous message was already corrected and the RAM had a means of tracking such correction. The messages associated with MSN 33 and 35 show potential examples of falsing, where characters were incorrectly translated, but no errors were detected for messages having the same MSN. In the examples above, the user probably deleted the prior message because of quality. In the case of the phone extension, a error in the number probably caused the user to call a wrong extension. If the subsequent message with the same MSN has the correct extension, then the duplicate processing might discard the message unless the method establishes a threshold of acceptable duplicate characters for duplicate messages as will be explained below. In this instance, since a small number of characters (5 characters for "X2378" or "X2388"), a high threshold should be set wherein falsing will be essentially ignored by the duplicate message processing. In the case where there are more characters, like the example for "HDLP ME!" and "HELP ME!" for MSN 35, a ratio of 7 duplicate characters to 8 total character may appropriately exceed a given threshold (that may either be dynamically set or predetermined) that would allow the duplicate message processing to treat the duplicate message with the same MSN as a duplicate. In this instance, the user would not receive an alert for the subsequent message having the MSN 35.

In accordance with one aspect of the present invention, the selective call device 122 preferably comprises a selective call receiver (303) coupled to a decoder and a controller, preferably in the form of a processor (308). The selective call device 122 further includes a memory coupled to the processor, wherein the processor is programmed to direct the selective call receiver to receive a first message having a first set of message data and a message sequence number (MSN) associated with the first message. The processor further creates error indications corresponding to errors detected in portions of the first set of message data. The processor may also store the first message along with a deletion status containing an error status for the first message in the memory and further direct the selective call receiver to receive a subsequent message having the same message sequence number and a subsequent set of message data. If the message is a duplicate message it will preferably have the same data or data substantially similar to the first set of message data. Once again, the processor will create error indications corresponding to errors detected in the portions of the subsequent set of message data. The processor then compares the first set of message data and its corresponding error indications with the subsequent set of message data and its corresponding error indications. If the subsequent message has less error indications than the first message, the processor will preferably tag the subsequent message to form a tagged message and further process the tagged message utilizing the deletion status containing the error status for the first message. It should be understood that the operation described above could work equally well for a selective call device that is a two-way device having a selective call transmitter coupled to the controller and encoder as well as one-way selective call receiver.

In accordance with another aspect of the present invention, the selective call device 122 alternatively comprises a selective call receiver coupled to a decoder and a controller and a memory coupled to the controller. The controller is preferably programmed to direct the selective call receiver to receive a message having message data and a message sequence number associated with the message. The controller would further create error indications in the message data for respective portions of the message data received with errors and compare the message and the error indications with a prior message having the same message sequence number and respective error indications from a set of messages already stored in the memory. The controller further determines whether a ratio of duplicate characters to total characters found in both the message and the prior message exceeds a threshold. This threshold can either be predetermined or dynamically changed based on the size of the message received. For instance, with a dynamically set threshold, if the message has few characters, the threshold would preferably be set high, whereas messages with many characters would have a lower threshold setting. In more concrete terms, a subscriber user that receives a numeric message with 10 characters would be less likely to tolerate errors than a user receiving an alphanumeric message with 25 characters. Finally, the controller tags the message to form a tagged message if the message has a ratio exceeding the threshold and has less error indications than the prior message. The tagged message is then used in further processing of the message as a duplicate message in accordance with the present invention. As discussed above, it should be understood that the operation described could work equally well for a selective call device that is a two-way device having a selective call transmitter coupled to the controller and encoder as well as one-way selective call receiver.

Message Sequence Numbers (MSNs) provide the ability to resolve transactions associated with different messages going to/from the same address. They also allow the system and the PSU to transmit and receive multiple fragmented messages that may overlap in time. MSNs are also used to issue commands and responses related to a specific message. They help associate fragments, commands, acknowledgments, etc. to a particular transmitted message. An MSN can be though of as a "session number". All fragments, acknowledgments, etc. related to a message are tagged with the same MSN during the delivery of the message. A MSN must remain the same when a particular message is repeated and must attempt to be unique for each different message being transmitted to or from the same address.

A separate MSN is used for transmitting messages to each address of a subscriber unit. For example, a subscriber unit that has multiple Information Service Addresses will correctly distinguish messages with the same MSN transmitted to different addresses.

The PSU assigns MSNs for messages that originate at the PSU and the System Controller assigns all other MSNs. Preferably a 7 bit field is used as follows:

| MSN | | Range |
|---|---|---|
| 0 | Command or response not related to a message | |
| 1 | Command or response related to all reverse channel messages | |
| 2 | Command or response related to all forward channel messages | |
| 3 | Command or response related to all forward and reverse channel messages | |
| 4–7 | Reserved | |
| 8–31 | Message originated by the PSU | 24 |
| 32–127 | Message originated by the system to a specific PSU | 96 |

Forward channel MSNs have a limited range and are reused by the system. The subscriber unit must distinguish ongoing transactions for an existing message from the first transaction of a new message with the same MSN. The system assigns MSNs to new forward channel messages in increasing circular order, restarting at 32 after MSN 127 has been used. Sliding windows are used by the system and by the subscriber unit. The window size is 90. The leading edge of the system window is the most recent, most advanced MSN used by the system.

The processor 308 also is coupled to a read-only memory (ROM) 310 comprising firmware elements for use by the processor 308. The firmware elements comprise a call processing element 311 for handling of incoming messages on the outbound channel using techniques well known in the art. The call processing element 311 may further comprise routines to determine the current zone that the portable subscriber unit 122 is located in and procedures for updating the current zone identifier. In addition, the firmware elements preferably include a zone comparator 315, registration process 316, as well as a duplicate message processing routine 314. The duplicate message processing routine is further described with respect to the description of FIG. 10.

When an address is received by the processor 308, the call processing element 311 compares the received address with at least one selective call addresses 323, and when a match is detected, a call alerting signal is preferably generated to alert a user that a message has been received. The call alerting signal is directed to a conventional audible or tactile alert device 318 coupled to the processor 308 for generating an audible or tactile call alerting signal. In addition, the call processing element 311 processes the message which preferably is received in a digitized conventional manner, and then stores the message in the message storage location 324 in the RAM 322. The message can be accessed by the user through conventional user controls 317 coupled to the processor 308, for providing functions such as reading, locking, and deleting a message. Alternatively, messages could be read through a serial port (not shown). For retrieving or reading a message, an output device 320, e.g., a conventional liquid crystal display (LCD), preferably also is coupled to the processor 308. It will be appreciated that other types of memory, e.g., EEPROM, can be utilized as well for the ROM 310 or RAM 322 and that other types of output devices, e.g., a speaker, can be utilized in place of or in addition to the LCD, particularly in the case of receipt of digitized voice.

The processor 308 preferably is implemented utilizing a microcomputer similar to the MC68HC11 series microcomputer, manufactured by Motorola, Inc. of Schaumburg, Ill. or other functionally equivalent Digital Signal Processor available from Motorola or Lucent Technologies. It will be appreciated that other similar microcomputers can be used as well for the processor 308, and that the ROM 310, the RAM 322, and/or the EEPROM 321 also can be included as a portion of the processor 308.

Before the fixed portion 102 can originate communication with a portable subscriber unit 122 in a zoned communication system, the fixed portion 102 should know the zone in which the portable subscriber unit 122 is located (unless a nationwide message is sent). In a two-way messaging systems in accordance with present invention, the fixed portion 102 relies on the portable subscriber unit 122 to register when entering a new zone. When the fixed portion 102 has a message to deliver to a portable subscriber unit 122 but has not recorded the location of the portable subscriber unit 122 through a registration thereof, the fixed portion 102 proceeds with a series of broadcasts requesting the portable subscriber unit 122 to respond. By observing which base station 116 receives the PSU's response, the fixed portion 102 can determine the location of the portable subscriber unit 122.

When the system does not know that the pager has received the message, the system will store that message and wait for the selective call device to return to a region or zone where there is good 1 and 2-way coverage (i.e., wait for the selective call device to register). Since the selective call device may register hours or even days later, the system does not want to send messages hours or days old with the same sense of urgency as immediate delivery messages, thus the system marks the messages in some way to inform the user that the message has been stored (resent for confirmation, stored, etc.) Furthermore, if the user manually deletes the message, and it is retransmitted, then the user should not be alerted for the same message that was deleted. A codeplug (EEPROM 321) parameter preferably exists to decide if the message was deleted due to convenience (the user got the message and just did not like it cluttering up the user interface or taking up memory space), or because of quality (it had too many errors). Since the updated message has different text in it (the stored indication), there will be transmitted text (marker or special character or control character) that indicates a termination condition for message duplication, wherein the duplication processor ignores all characters following the special character for duplicate message determination purposes. Finally, the timeframe for duplication is a preferably a codeplug parameter. Messages can be marked with a system delivery timestamp, and can be adjusted by received timezone to assure correct timelines of duplication lifetime.

Figure 4:
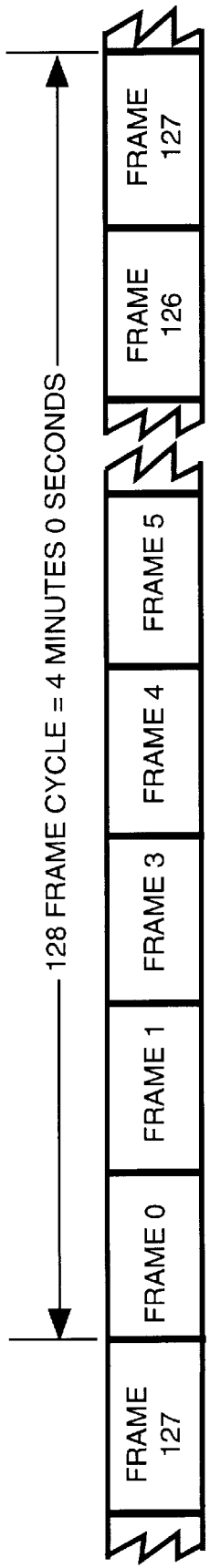
FIGS. 4–6 are timing diagrams illustrating a signaling protocol in accordance with the present invention.
Figure 5:
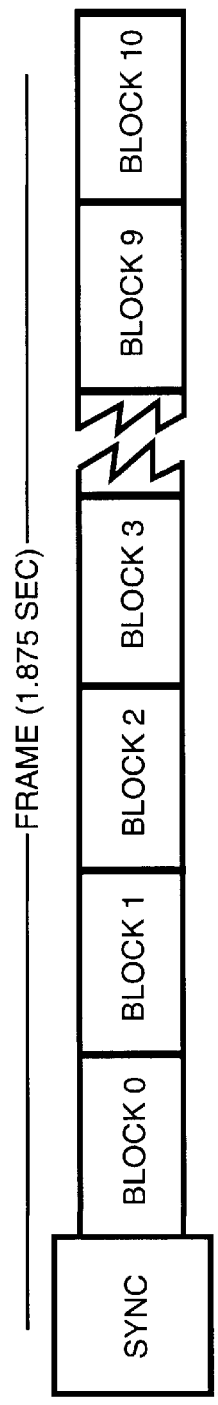
Figure 6:
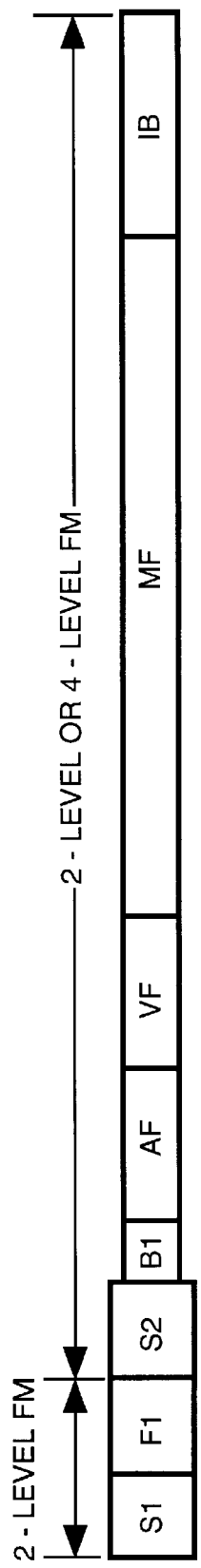

Referring to FIGS. 4–6, an example of a selective call communication system to which the present invention pertains is shown. The signaling system shown comprises 128 frames, with each frame numbered 0 to 127. The frames are transmitted at 32 frames per minute, and thus a full 128 frame cycle lasts 4 minutes. One hour is divided into 15 cycles numbered 0 through 14. It is a synchronous time slot protocol tied to a universal time reference. Frame 0 is synchronized to the start of each hour so that the receiver can derive real time from the current frame and cycle number, thus providing the receiver accurate time within the hour with no need for adjustment.

Moreover, the protocol supports multiple time division multiplexed "phases", wherein for example, a 6400 bits per second (bps) data stream is time division multiplexed into four data streams of 1600 bps. Such a signaling structure is disclosed in commonly assigned U.S. Pat. No. 5,168,493, the entire text and drawings of which is herein incorporated by reference. Thus, the general frame structure shown in FIG. 1 for the single phase shown in FIG. 1 is the same throughout each of four phases.

Each frame (FIG. 5) comprises a sync portion and several blocks. The sync portion (FIG. 6) further comprises a Sync 1 portion (S1), a frame information (FI) word and a Sync 2 portion (S2).

Each receiver is preferably assigned a base frame in the set of 128 frames appearing on an radio frequency (RF) channel. A receiver can trade battery life for the more frequent delivery of messages by being assigned to monitor more than one frame per cycle. This can be done by altering a collapse value or indicating a carry-on. In any event, once a receiver acquires synchronization to the RF channel, it expects to find its assigned frame within a very tight time window. The use of 4-level FM doubles the data transmission rate per symbol (as compared to 2-level FM) which helps to reduce the effect of simulcast distribution errors and the effect of propagation timing differences between multiple signals within the capture range of the receiver.

As shown in FIG. 6, the Sync 1 (S1) portion of each frame provides for frame timing, symbol timing and indicates the speed of the remainder of the frame. The frame information (FI) word preferably carries 11 bits for the frame and cycle numbers, 5 bits for indication of the time division multiplexed phase of low traffic, 1 bit called a Network Roaming Channel Bit to indicate the presence of a frequency supporting Network-wide roaming service, and other information. The Network Roaming Channel Bit is used to trigger recognition of certain network roaming information which will be described in conjunction with FIG. 7.

The Sync 2 (S2) portion provides for synchronization at the frame's block speed to allow for proper de-multiplexing and decoding of the blocks.

The Block Information (BI) field is the first 1–4 words, called block information worlds, of the first interleaved block and contains frame and system structure information, some of which is pertinent to the present invention and is explained in

| | | |
|---|---|---|
| t = 1 | Indicates address field contained in block 0 | |
| t = 0 | Indicates address field extends past block 0 | |

These flags give early indication that the traffic is light and all addresses are contained within block 0.

x Standard 4 bit Check Character

FIG. 8 illustrates an example of block information word 1. Block information word 1 has 2 "a" bits, a0a1, which indicate the start of the address field, 6 "v" bits v5v4v3v2v1v0 which define the start of the vector field, 2 "c" bits c1c0 which indicate traffic overflow into the next frame(s), 3 "m" bits m0m1m2 which indicate the number of high order frame number bits to be masked and 4 "P" bits P3P2P1P0, which indicate the number of priority addresses at the beginning of the address field.

FIG. 9 illustrates an example of block information words 2, 3 and 4. Word Format Type is represented by format bits f2f1f0, s represents the data and x again is the standard 4 bit Check Character.

Figure 10:
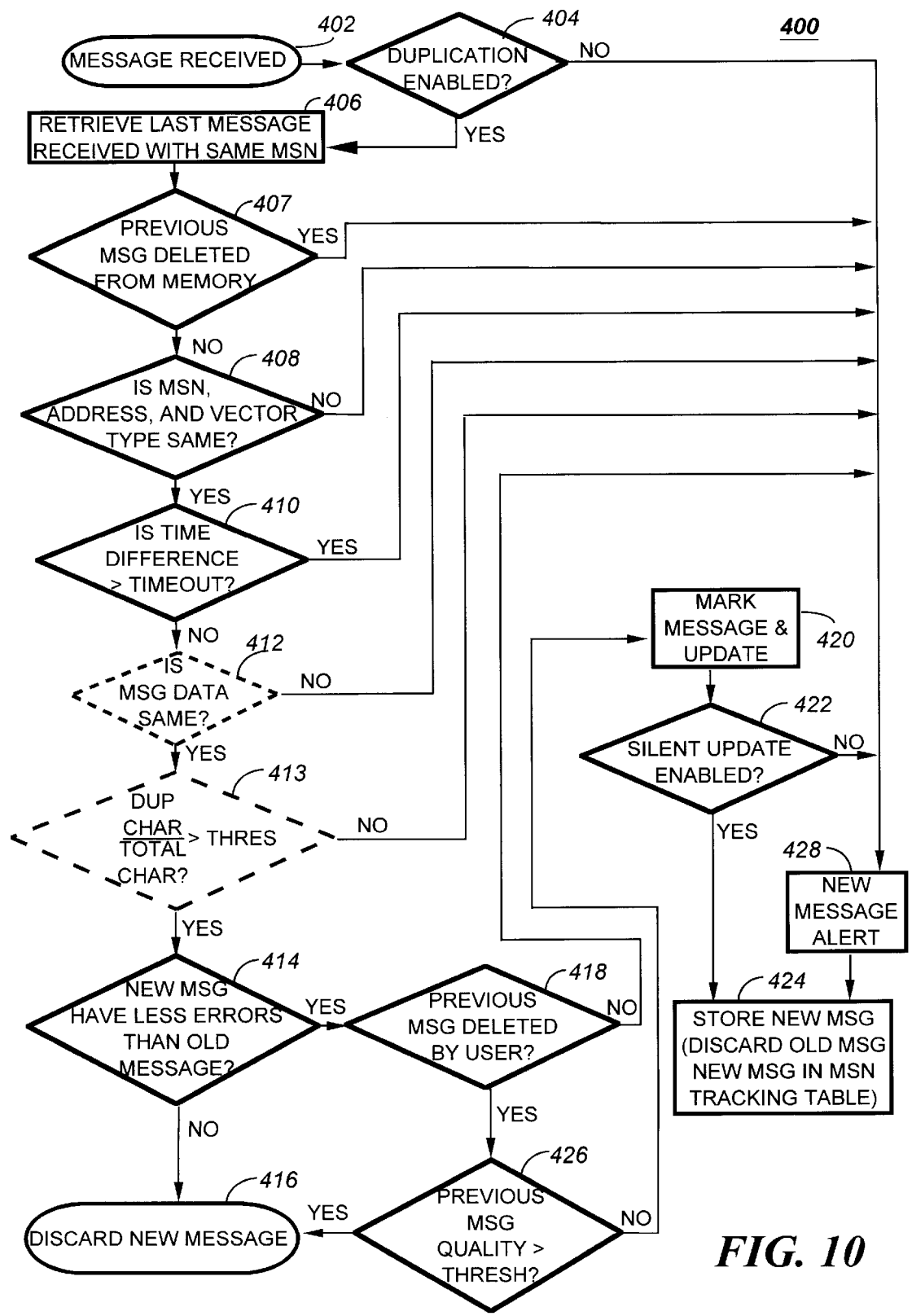
FIG. 10 is a flow chart depicting operation of the portable subscriber unit in accordance with the present invention.

Referring to FIG. 10, a flow chart illustrating a method 400 of the operation of a portable subscriber unit (PSU) in accordance with the present invention is shown. At step 402 a message (or subsequent message) is received. Preferably, the message is an alphanumeric message. At decision block 404, the processor or controller in the PSU greater detail hereinafter.

The address field (AF) starts directly after the block information words and consists of short addresses and long addresses. The vector field (VF) maintains a 1 to 1 relationship with the address field. The vector word points to the start word of the associated message. The message field (MF) contains the message words specified by the vector field. IB represents idle blocks which are unused and are filled with appropriate bit patterns.

FIG. 7 illustrates the structure of the frame information word in greater detail. The various parameters in the frame information word are defined as follows:

| | | | |
|---|---|---|---|
| C | Cycle Number (0–14) | c3c2c1c0 | 15/hour |
| f | Frame Number (0–127) | f6f5f4f3f2f1f0 | 128/cycle |
| n | Network Roaming Channel Bit | n = 1 | indicates | network support for roaming and n = 0 indicates no network support for roaming r Repeat Paging Indicator
    If r = 1, t3t2t1t0 are reserved to indicate a repeat format exists
    If r = 0, tt3t2t1t0 are Low Traffic flags for each phase in a frame t Definition dependent on value of "r"
    At 3200 bits/sec t3 = t2 and t1 = t0 representing two phases in the frame At 1600 bits/sec t3=t2=t1=t0 representing one phase in the framedetermines if duplication processing is enabled. If it is not enabled, then each new message regardless of a repeat MSN will alert as a new message at step 428. If duplication processing is enabled, then the processor will attempt to retrieve the last message received with the same MSN at step 406. At decision block 407, if the previous message having the same MSN is deleted from memory, then the new message will not be treated as a duplicate and a new message alert will be given at step 428. If the new message has not been deleted from memory at decision block 407, then the next inquiry is made at decision block 408. At decision block 408, if the MSN, address and Vector type (or any other negating bits of information indicating a different message) are different than the respective bits of information from the retrieved message having the same MSN, then the message is treated as a new message and an alert is given at step 428. If the MSN, address and Vector type (or any other confirming bits of information indicating a duplicate message) are the same as the retrieved message having the same MSN at decision block 408, then the method proceeds to determine if the time difference between receipt of the subsequent duplicate message and the old message (having the same MSN, address and vector) exceed a timeout threshold at decision block 410. This timeout threshold is preferably set in the PSU's codeplug or EEPROM (321) by the service provider. Assuming the timeout threshold is set to 72 hours, if a new message having the same MSN is received after 3 days (72 hours), then the new message will not be treated as a duplicate and the new message alert is given at step 428. If the new message is received within the timeout threshold (within 72 hours) at decision block 410, then the actual message data is compared for similarity at decision block 412. Errors detected in a prior message are treated as wildcards and will match any characters in its place unless the error(s) were falsely converted to another character. Thus, in the alternative, if the MSN, address and vectors match at step 408 and the new message is received within the timeout threshold at decision block 410, then an analysis that is more tolerant and/or accounts for falsing can be done at an alternate decision block 413. In this instance, the processor would make a determination whether a ratio of duplicate characters to total characters found in both the message and a prior message exceeds a threshold which may be predetermined or dynamic as previously explained. (It should be understood that it is contemplated within the scope of the claimed invention that a ratio of non-duplicate characters to total characters could also be used to equally decide if a message should be treated as a new message or a duplicate message. If the ratio of non-duplicate characters to duplicate characters exceeds a threshold, then it is likely that the message should be treated as a new message and not as a duplicate.)

If the ratio of duplicate characters to total characters fails to exceed the threshold, then new message will be treated as a new message and an alert will be given at step 428. If the ratio exceeds the threshold in decision block 413 (or if the message data is the same at decision block 412), then a determination is made whether the new message has less errors than the prior message having the same MSN at decision block 414. If the new message has more errors than the prior message, then the new message is discarded at step 416. If the new message has less errors, then a determination is made whether the old message was deleted by the user at decision block 418. If the previous message was not deleted by the user at decision block 418, the new message is treated as a new message and a new message alert is provided at step 428. If the message was deleted by the user at decision block 418, then deletion could have been done for several reasons. Decision block 426 helps provide a determination as to the reason for the deletion by the user. If the user deleted a message out of convenience (to save up memory space or clear up a user interface for instance) where the previous message was received without errors or with a minimal amount of errors that exceed a quality threshold, then the processor at decision block 426 determines that the new duplicate message should be discarded at step 416. (The quality threshold can simply be a similar analysis as was done with respect to decision block 413 or any other means of quantifying the quality of a received message). But, if the user deleted the message due to the quality of the message previously received (i.e., the prior message was received with errors or with a minimum amount of errors that falls below a particular quality threshold), then it is likely that the processor at decision block 426 determines that the previous message had errors and the new message should be either tagged as an replacement or as an update to the previous message at step 420. Additionally, this tagged message will get updated at step 420. If the portable subscriber unit has a silent update enabled at decision block 422, then the new duplicate message is stored and the old message is preferably discarded. Additionally, the new message will be reflected in the MSN tracking table. If the silent update is not enabled, the user will get alerted at step 428 with the updated duplicate message.

It should be understood that the disclosed embodiments are merely examples and the invention is not restricted thereto. It will be understood by those skilled in the art that variations and modifications can be made within the scope and spirit of the present invention as defined by the appended claims.

What is claimed is:

1. A method for duplicate message processing at a portable subscriber unit, comprising the steps of:

receiving a first message having a first set of message data and a message sequence number associated with the first message;

creating error indications corresponding to errors detected in portions of the first set of message data;

storing the first message along with a deletion status containing an error status for the first message in a memory location at the portable subscriber unit;

retaining the deletion status and the error status of the first message when the first message is deleted;

receiving a subsequent message having the same message sequence number and a subsequent set of message data;

creating error indications corresponding to errors detected in the portions of the subsequent set of message data;

comparing the first set of message data and its corresponding error indications with the subsequent set of message data and its corresponding error indications;

tagging the subsequent message to form a tagged message if the subsequent message has less error indications than the first message; and processing the tagged message utilizing the deletion status containing the error status for the first message.

2. The method of claim 1, wherein the step of processing further comprises the step of storing the tagged message in the memory and updating the first message if the subsequent message has less error indications than first message and if the first message was deleted and had an error status indicating an insufficient quality in the first message.

3. The method of claim 1, wherein the step of processing further comprises the step of storing the tagged message in the memory and updating the first message if the subsequent message has less error indications than first message and if the first message was not deleted.

4. The method of claim 1, wherein the method further comprises the steps of storing the tagged message in the memory and updating the first message if the subsequent message has less error indications than the first message without alerting the user of the portable subscriber unit if a "silent update" option is enabled and otherwise alerting the user if the silent update option is disabled.

5. The method of claim 1, wherein the method further comprises the step of alerting a user of the portable subscriber unit if the subsequent message has less error indications than the first message.

6. The method of claim 1, wherein the method further comprises the step of deleting the first message if the subsequent message has less error indications than the first message.

7. The method of claim 1, wherein the method further comprises the step of discarding the subsequent message if the subsequent message has more errors than the first message.

8. The method of claim 1, wherein the method further comprises the step of discarding the subsequent message if the first message had no error indications.

9. The method of claim 1, wherein the method further comprises the step of alerting a user of the portable subscriber unit if the subsequent message is received outside a predetermined time threshold after the receipt of the first message.

10. The method of claim 1, wherein the step of comparing further comprises the step of comparing address and vector types.

11. A method for enhanced duplicate message processing at a portable subscriber unit, comprising the steps of:

receiving a message having message data and a message sequence number associated with the message;

creating error indications in the message data for respective portions of the message data received with errors;

comparing the message and the error indications with a prior message having the same message sequence number and respective error indications from a set of messages already stored in a memory at the portable subscriber unit, wherein the step of comparing further comprises the step of determining whether a ratio of duplicate characters to total characters found in both the message and prior message exceeds a threshold; and tagging the message to form a tagged message if the message has a ratio exceeding the threshold and has less error indications than the prior message.

12. The method of claim 11, wherein the method further comprises the step of alerting a user of the portable subscriber unit if the ratio of duplicate characters to total characters found in both the message and prior message is at or below the threshold.

13. The method of claim 11, wherein the method further comprises the step of storing the tagged message in the memory and updating the prior message if the message has less error indications than the prior message.

14. The method of claim 11, wherein the method further comprises the step of alerting a user of the portable subscriber unit if the message has less error indications than the prior message.

15. The method of claim 11, wherein the method further comprises the step of deleting the prior message if the message has less error indications than the prior message.

16. The method of claim 11, wherein the method further comprises the steps of storing the tagged message in the memory and deleting the second message having the same message sequence number from the memory.

17. The method of claim 11, wherein the method further comprises the step of discarding the message if the message has more errors than the prior message.

18. The method of claim 11, wherein the method further comprises the step of discarding the message if the second message had no error indications.

19. A selective call device, comprising:

a selective call receiver coupled to a decoder and a controller; and a memory coupled to the controller, wherein the controller is programmed to:

direct the selective call receiver to receive a first message having a first set of message data and a message sequence number associated with the first message;

create error indications corresponding to errors detected in portions of the first set of message data;

store the first message along with a deletion status containing an error status for the first message in the memory;

retain the deletion status and the error status of the first message when the first message is deleted;

direct the selective call receiver to receive a subsequent message having the same message sequence number and a subsequent set of message data;

create error indications corresponding to errors detected in the portions of the subsequent set of message data;

compare the first set of message data and its corresponding error indications with the subsequent set of message data and its corresponding error indications;

tag the subsequent message to form a tagged message if the subsequent message has less error indications than the first message; and process the tagged message utilizing the deletion status containing the error status for the first message.

20. The selective call device of claim 19, wherein the selective call device further comprises a selective call transmitter coupled to the controller and an encoder.

21. A selective call device, comprising:

a selective call receiver coupled to a decoder and a controller; and a memory coupled to the controller, wherein the controller is programmed to:

direct the selective call receiver to receive a message having message data and a message sequence number associated with the message;

create error indications in the message data for respective portions of the message data received with errors;

compare the message and the error indications with a prior message having the same message sequence number and respective error indications from a set of messages already stored in the memory, wherein the controller further determines whether a ratio of duplicate characters to total characters found in both the message and the prior message exceeds a predetermined threshold; and tag the message to form a tagged message if the message has a ratio exceeding the predetermined threshold and has less error indications than the prior message.

22. The selective call device of claim 21, wherein the selective call device further comprises a selective call transmitter coupled to the controller and an encoder.

* * * * *